United States Patent
Himeda et al.

(10) Patent No.: US 9,800,169 B2
(45) Date of Patent: Oct. 24, 2017

(54) DC POWER SUPPLY DEVICE AND LIGHTING SYSTEM USING SAME

(71) Applicant: Panasonic Intellectual Property Management Co., Ltd., Osaka (JP)

(72) Inventors: Masato Himeda, Nara (JP); Hiroyuki Asano, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/397,954

(22) Filed: Jan. 4, 2017

(65) Prior Publication Data

US 2017/0201187 A1 Jul. 13, 2017

(30) Foreign Application Priority Data

Jan. 12, 2016 (JP) ................. 2016-003933

(51) Int. Cl.
*H05B 33/08* (2006.01)
*H02M 7/06* (2006.01)
*H02M 1/32* (2007.01)
*H02M 3/155* (2006.01)
*H02M 1/42* (2007.01)

(52) U.S. Cl.
CPC .............. *H02M 7/06* (2013.01); *H02M 1/32* (2013.01); *H05B 33/0815* (2013.01); *H05B 33/0887* (2013.01); *H02M 1/4241* (2013.01); *H02M 2003/1557* (2013.01)

(58) Field of Classification Search
None
See application file for complete search history.

(56) References Cited

U.S. PATENT DOCUMENTS

| | | | |
|---|---|---|---|
| 6,304,464 B1* | 10/2001 | Jacobs | H05B 33/0815 315/169.3 |
| 8,742,674 B2* | 6/2014 | Shteynberg | H05B 33/0815 315/201 |
| 2012/0119676 A1* | 5/2012 | Yao | H01F 38/42 315/297 |
| 2015/0312983 A1* | 10/2015 | Hu | F21K 9/1355 315/186 |

FOREIGN PATENT DOCUMENTS

JP 2011-082204 4/2011

* cited by examiner

*Primary Examiner* — Jany Richardson
(74) *Attorney, Agent, or Firm* — Renner, Otto, Boisselle & Sklar, LLP

(57) ABSTRACT

A DC power supply device includes a rectifier circuit, a conversion circuit and a control circuit. Conversion circuit includes a first capacitor, a first series circuit, a second series circuit, a third series circuit, a second diode and a Zener diode. First series circuit includes a first inductor and a switching element connected in series with each other. Second series circuit includes a second capacitor and a second inductor connected in series with each other. Third series circuit includes a first diode and a third capacitor connected in series with each other. First series circuit is electrically connected between both ends of first capacitor. Second series circuit is electrically connected in parallel with switching element. A cathode of Zener diode is connected with a connection point of first inductor and second capacitor. Zener diode has a Zener voltage larger than an output voltage of conversion circuit.

8 Claims, 1 Drawing Sheet

DC POWER SUPPLY DEVICE AND LIGHTING SYSTEM USING SAME

CROSS-REFERENCE TO RELATED APPLICATIONS

This application is based upon and claims the benefit of priority of Japanese Patent Application No. 2016-003933, filed on Jan. 12, 2016, the entire content of which is incorporated herein by reference.

TECHNICAL FIELD

This disclosure relates to a DC power supply device, and a lighting system using the same.

BACKGROUND ART

As a conventional example of a DC power supply device, there has been an LED (Light Emitting Diode) driving device that is disclosed in JP 2011-82204 A (hereinafter, referred to as "Document 1"). The LED driving device in Document 1 performs, with a diode bridge, full-wave rectification for an AC voltage received from an AC power source, and then converts, with a DC-DC converter of a switching-control system, the full-wave-rectified pulsating voltage into a desired DC voltage. In addition, Document 1 discloses that a so-called SEPIC (Single Ended Primary Inductance Converter) is used as the DC-DC converter in the LED driving device.

Incidentally, components other than a switching element, an output capacitor and a diode, of circuit components constituting a SEPIC, form an LC resonance circuit. Specifically, the LC resonance circuit is formed by an input capacitor, a coupling capacitor, a first inductor and a second inductor, as the components. After power from the AC power source is started to be supplied, a resonance current may flow through the LC resonance circuit during a period until start of the switching operation of the switching element. Here the switching element is connected in parallel with a series circuit of the input capacitor and the first inductor, and further in parallel with a series circuit of the coupling capacitor and the second inductor. As a result, when the resonance current flows through the LC resonance circuit as described above, there is a possibility that an excess voltage is applied to the switching element. In particular, the possibility will be remarkable, when power from the AC power source is started to be supplied in a state where a voltage of the AC power source is high.

SUMMARY

The present disclosure is directed to a DC power supply device, which can suppress an excess voltage from being applied to a switching element, and a lighting system using the DC power supply device.

A DC power supply device according to an aspect of the present disclosure includes a rectifier circuit, a conversion circuit and a control circuit. The rectifier circuit is configured to rectify an AC voltage output from an AC power source. The conversion circuit is configured to convert a pulsating voltage from the rectifier circuit into a DC voltage. The control circuit is configured to control the conversion circuit. The conversion circuit includes a first capacitor, a first series circuit, a second series circuit, a third series circuit, a second diode and a Zener diode. The first series circuit includes a first inductor and a switching element that are connected in series with each other. The second series circuit includes a second capacitor and a second inductor that are connected in series with each other. The third series circuit includes a first diode and a third capacitor that are connected in series with each other. The first capacitor is electrically connected with a pair of output ends of the rectifier circuit. The first series circuit is electrically connected between both ends of the first capacitor. The second series circuit is electrically connected in parallel with the switching element. The third series circuit is electrically connected in parallel with the second inductor. The control circuit is configured to perform switching control for the switching element. The second diode has: an anode; and a cathode that is connected with a connection point of the first capacitor and the first inductor. The Zener diode has: an anode; and a cathode that is connected with a connection point of the first inductor and the second capacitor. The anode of the second diode and the anode of the Zener diode are electrically connected with each other. The Zener diode has a Zener voltage larger than an output voltage of the conversion circuit.

A lighting system according to an aspect of the present disclosure includes: the DC power supply device; and a light source configured so as to be driven by the output voltage of the conversion circuit of the DC power supply device.

BRIEF DESCRIPTION OF THE DRAWINGS

The figures depict one or more implementations in accordance with the present disclosure, by way of example only, not by way of limitations. In the figures, like reference numerals refer to the same or similar elements.

DETAILED DESCRIPTION

Hereinafter, a DC power supply device 1 and a lighting system using the DC power supply device, according to an embodiment of the present disclosure, will be described with reference to the figures.

The DC power supply device 1 according to the embodiment converts an AC voltage output from an AC power source AC1 into a DC voltage, and supplies the converted DC voltage to a load (for example, a light source 90). The light source 90 includes, for example, two or more light-emitting diodes electrically connected in series. The lighting system according to the embodiment includes the DC power supply device 1 and the light source 90. The light source 90 includes the light-emitting diodes as one example, but is not limited to such a configuration. The light source 90 may include an organic EL (Electro Luminescence) element, for example.

Figure 1:
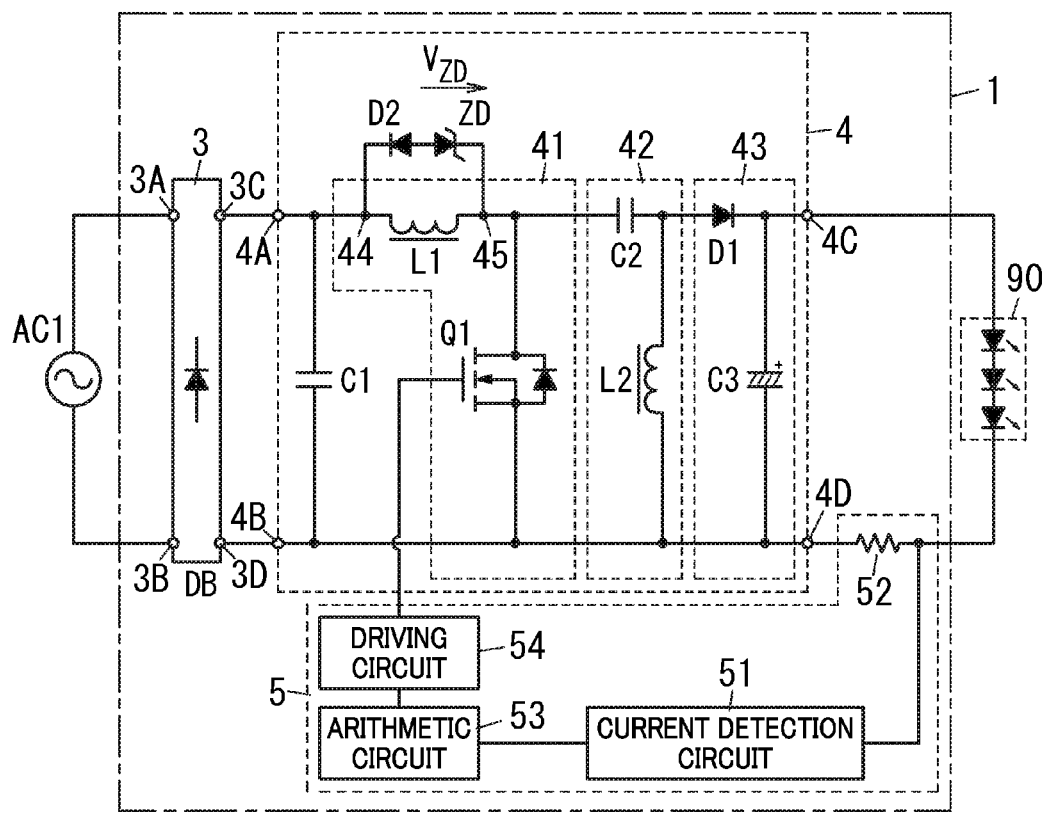
FIG. 1 is a circuit block diagram illustrating a DC power supply device according to an embodiment.

As shown in FIG. 1, the DC power supply device 1 includes a rectifier circuit 3, a conversion circuit 4 and a control circuit 5.

The rectifier circuit 3 includes a diode bridge, and performs full-wave rectification for an AC voltage output from the AC power source AC1. The rectifier circuit 3 has a pair of input ends 3A and 3B. The AC power source AC1 is electrically connected between the paired input ends 3A and 3B. The rectifier circuit 3 further has a pair of output ends 3C and 3D. The paired output ends 3C and 3D are respectively electrically connected with input ends 4A and 4B, which are paired, of the conversion circuit 4.

The conversion circuit 4 includes a SEPIC circuit that is a DC-DC converter of a switching-control system, and converts a pulsating voltage from the rectifier circuit 3 into a DC voltage. The conversion circuit 4 includes a first capacitor C1, a first series circuit 41 (a first inductor L1 and a switching element Q1), and a second series circuit 42 (a second capacitor C2 and a second inductor L2). The conversion circuit 4 further includes a third series circuit 43 (a first diode D1 and a third capacitor C3), a second diode D2 and a Zener diode ZD. The conversion circuit 4 has the pair of input ends 4A and 4B, and a pair of output ends 4C and 4D.

Both ends of the first capacitor C1 are respectively electrically connected with the paired input ends 4A and 4B. The switching element Q1 is configured by a MOSFET (Metal Oxide Semiconductor Field Effect Transistor), for example. The first series circuit 41 includes the first inductor L1 and the switching element Q1 that are connected in series with each other. In the first series circuit 41, a first end of the first inductor L1 is electrically connected with a drain terminal of the switching element Q1. A second end of the first inductor L1 in the first series circuit 41 is electrically connected with a first end on a high potential side, of the first capacitor C1, and a source terminal of the switching element Q1 in the first series circuit 41 is electrically connected with a second end on a low potential side, of the first capacitor C1. As a result, the first series circuit 41 is electrically connected in parallel with the first capacitor C1. The second series circuit 42 includes the second capacitor C2 and the second inductor L2 that are connected in series with each other. In the second series circuit 42, a first end on a low potential side, of the second capacitor C2, is electrically connected with a first end of the second inductor L2. A second end on a high potential side, of the second capacitor C2, in the second series circuit 42 is electrically connected with the drain terminal of the switching element Q1 in the first series circuit 41. A second end of the second inductor L2 in the second series circuit 42 is electrically connected with the source terminal of the switching element Q1 in the first series circuit 41. As a result, the second series circuit 42 is electrically connected in parallel with the switching element Q1. The third series circuit 43 includes the first diode D1 and the third capacitor C3 that are connected in series with each other. In the third series circuit 43, a cathode of the first diode D1 is electrically connected with a first end on a high potential side, of the third capacitor C3. An anode of the first diode D1 in the third series circuit 43 is electrically connected with the first end of the second inductor L2 in the second series circuit 42. A second end on a low potential side, of the third capacitor C3 in the third series circuit 43 is electrically connected with the second end of the second inductor L2 in the second series circuit 42. Accordingly, the third series circuit 43 is electrically connected in parallel with the second inductor L2. The light source 90 is electrically connected in parallel with the third capacitor C3.

A cathode of the second diode D2 is electrically connected with a connection point 44 of: the first end on the high potential side, of the first capacitor C1; and the second end of the first inductor L1. A cathode of the Zener diode ZD is electrically connected with a connection point 45 of: the first end of the first inductor L1; and the second end on the high potential side, of the second capacitor C2. An anode of the second diode D2 and an anode of the Zener diode ZD are electrically connected with each other. The Zener diode ZD has a Zener voltage larger than an output voltage of the conversion circuit 4 (i.e., a voltage across the third capacitor C3).

The control circuit 5 is configured to perform switching control for keeping constant an output current of the conversion circuit 4 by subjecting ON/OFF of the switching element Q1 to PWM (Pulse Width Modulation) control. The control circuit 5 includes a current detection circuit 51, a current detection resistor 52, an arithmetic circuit 53 and a driving circuit 54. The current detection circuit 51 is, for example, configured to sample a voltage (hereinafter, referred to as a "detection voltage") across the current detection resistor 52 that is disposed between a cathode of the light source 90 and the output end 4D of the conversion circuit 4 so that those are electrically connected in series, and then perform A/D conversion for the sampled voltage. The arithmetic circuit 53 performs an arithmetic operation for changing a duty ratio of a PWM signal so that the detection voltage (a digital detection value) detected by the current detection circuit 51 agrees with a prescribed target value. Specifically, the arithmetic circuit 53 increases an ON-period during which the switching element Q1 is in an ON-state when the digital detection value is smaller than the prescribed target value, but decreases the ON-period when the digital detection value is larger than the prescribed target value. The driving circuit 54 switches on or off the switching element Q1 according to the PWM signal output from the arithmetic circuit 53.

Hereinafter, operation of the conversion circuit 4 will be described.

When the switching element Q1 is switched from an OFF-state to the ON-state, electric current flows through a path that includes the first capacitor C1, the first inductor L1, the switching element Q1 and the first capacitor C1 in that order. In addition when the switching element Q1 is switched from the OFF-state to the ON-state, electric current flows through a path that includes the second capacitor C2, the switching element Q1, the second inductor L2 and the second capacitor C2 in that order. Therefore while the switching element Q1 is in the ON-state, magnetic energy is accumulated in the first inductor L1 and the second inductor L2.

When the switching element Q1 is switched from the ON-state to the OFF-state, an electromotive force is generated in the first inductor L1. Accordingly, electric current flows through a path that includes the first inductor L1, the second capacitor C2, the first diode D1, the third capacitor C3, the first capacitor C1 and the first inductor L1 in that order. In addition when the switching element Q1 is switched from the ON-state to the OFF-state, an electromotive force is generated also in the second inductor L2. As a result, electric current flows through a path that includes the second inductor L2, the first diode D1, the third capacitor C3 and the second inductor L2 in that order. Therefore the second capacitor C2 and the third capacitor C3 are charged, and DC current can be output to the light source 90 when a voltage across the third capacitor C3 is equal to or more than a prescribed threshold voltage (a forward voltage of the light source 90).

Here, the conversion circuit 4 includes an LC resonance circuit, and, after power from the AC power source AC1 is started to be supplied, the LC resonance circuit is formed by the first capacitor C1, the first inductor L1, the second capacitor C2 and the second inductor L2, as shown in FIG. 1. As described in the background art, after the power from the AC power source AC1 is started to be supplied, a resonance current may flow through the LC resonance circuit during a period until the start of the switching operation of the switching element Q1 by the control circuit 5. Furthermore, the switching element Q1 is connected in parallel with the first capacitor C1 and the first inductor L1, and further in parallel with the second series circuit 42 having the second capacitor C2 and the second inductor L2. Accordingly, in the conventional DC power supply device, an excess voltage may be applied to the switching element Q1 by the resonance current flowing through the LC resonance circuit.

On the other hand, in the DC power supply device 1, the Zener diode ZD is electrically connected in parallel with the first inductor L1. For this reason, a resonance voltage generated in the first inductor L1 is clamped to a Zener voltage $V_{ZD}$ of the Zener diode ZD, and therefore, a voltage larger than the Zener voltage $V_{ZD}$ is not applied across the first inductor L1. As a result, even when the resonance current flows through the LC resonance circuit, it is possible to reduce a voltage generated across the first inductor L1, compared with a circuit configuration that the Zener diode ZD is not provided. Accordingly, it is possible to reduce a voltage to be applied between the drain terminal and the source terminal of the switching element Q1 connected in series with the first inductor L1, and suppress the excess voltage from being applied to the switching element Q1.

In the DC power supply device 1, since the cathode of the second diode D2 is electrically connected with the connection point 44, it is possible to suppress excess current from flowing through the light source 90, even when a lightning surge voltage is applied to the AC voltage of the AC power source AC1.

In a state where the control circuit 5 is performing the switching operation of the switching element Q1, while the switching element Q1 is in the OFF-state, the following Formula (1) is satisfied with respect to a voltage across the first inductor L1. In Formula (1), "$V_{L1}$" denotes the voltage across the first inductor L1, and "$V_{in}$" denotes an input voltage of the conversion circuit 4. Also in Formula (1), "$V_{C2}$" denotes a voltage across the second capacitor C2, and "$V_{out}$" denotes an output voltage of the conversion circuit 4.

[Mathematical 1]

$$V_{L1} = V_{in} - V_{C2} - V_{out} \qquad \text{Formula (1)}$$

The voltage $V_{C2}$ across the second capacitor C2 has a variation width, in addition to the input voltage $V_{in}$ of the conversion circuit 4. Accordingly, the following Formula (2) is met with respect to the voltage $V_{C2}$ across the second capacitor C2. Note that, "$\Delta V_{C2}$" denotes the variation width of the voltage $V_{C2}$ across the second capacitor C2.

[Mathematical 2]

$$V_{C2} = V_{in} + \Delta V_{C2} \qquad \text{Formula (2)}$$

The following Formula (3) is met by substituting the voltage $V_{C2}$ in Formula (2) for Formula (1).

[Mathematical 3]

$$V_{L1} = -(\Delta V_{C2} + V_{out}) \qquad \text{Formula (3)}$$

Here in the conversion circuit 4, a Zener voltage of the Zener diode ZD is needed to be set larger than the absolute value of the voltage across the first inductor L1, in order to normally operate the switching element Q1. As a result, the DC power supply device 1 preferably includes the Zener diode ZD having a Zener voltage where a condition as the following Formula (4) is met. Note that, in Formula (4), "$V_{ZD}$" denotes the Zener voltage of the Zener diode ZD.

[Mathematical 4]

$$V_{ZD} > \Delta V_{C2} + V_{out} \qquad \text{Formula (4)}$$

Therefore, as long as the Zener voltage $V_{ZD}$ satisfies Formula (4), a normal voltage applied across the first inductor L1 is not clamped by the Zener diode ZD, which can stabilize the operation of the conversion circuit 4.

Also the following Formula (5) is met with respect to the variation width $\Delta V_{C2}$ of the voltage $V_{C2}$ across the second capacitor C2.

[Mathematical 5]

$$\Delta V_{C2} = \frac{1}{C_2} \cdot \int I_{C2} dt = \frac{1}{C_2} \int I_{L1} dt \qquad \text{Formula (5)}$$

Note that, "$C_2$" denotes a capacitance of the second capacitor C2, "$I_{C2}$" denotes current flowing through the second capacitor C2, and "$I_{L1}$" denotes current flowing through the first inductor L1.

Figure 2:
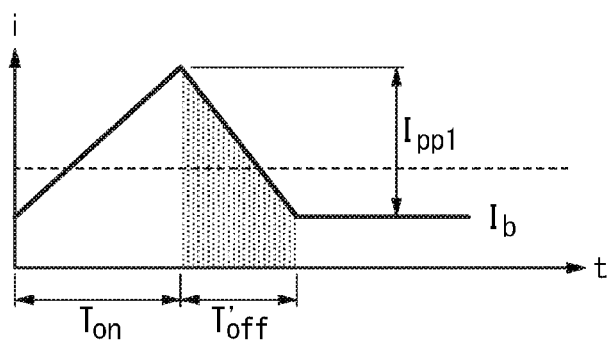
FIG. 2 is a timing chart illustrating operation of a conversion circuit of the DC power supply device according to the embodiment.

The integral term in Formula (5) represents an integrated value of current that flows through the first inductor L1 while the first diode D1 is in ON (i.e., while the first diode D1 is forward-biased), and it corresponds to a shaded area in FIG. 2. In FIG. 2, its vertical axis represents a current value, and its horizontal axis is a time axis. In FIG. 2, "$I_{pp1}$" denotes a variation width of the current $I_{L1}$ flowing through the first inductor L1, and "$I_b$" denotes a minimum value of the current $I_{L1}$ flowing through the first inductor L1. "$T_{on}$" denotes the ON-period during which the switching element Q1 is in ON, and "$T'_{off}$" denotes an ON-period during which the first diode D1 is in ON (i.e., during which the first diode D1 is forward-biased). Accordingly, the variation width $\Delta V_{C2}$ of the voltage $V_{C2}$ across the second capacitor C2 can be calculated by the following Formula (6).

[Mathematical 6]

$$\Delta V_{C2} = \frac{1}{C_2}\left(I_b + \frac{I_{pp1}}{2}\right) \cdot T'_{off} \qquad \text{Formula (6)}$$

The ON-period $T_{on}$ of the switching element Q1 can be calculated by the following Formula (7).

[Mathematical 7]

$$T_{on} = \sqrt{\frac{2V_f I_f L_{//} T}{V_{ac}^2}} \qquad \text{Formula (7)}$$

In this case, "$V_f$" denotes a forward voltage of the light source 90, and "$I_f$" denotes a forward current that flows through the light source 90. In addition, "$L_{//}$" denotes a combined impedance of the first inductor L1 and the second inductor L2, and "$V_{ac}$" denotes an AC voltage output from the AC power source AC1. "T" denotes a period of the switching element Q1 switching ON/OFF.

The ON-period $T'_{off}$ of the first diode D1 can be calculated by the following Formula (8).

[Mathematical 8]

$$T'_{off} = \frac{\sqrt{2}}{V_f} V_{ac} T_{on} = 2\sqrt{\frac{I_f L_{//} T}{V_f}} \qquad \text{Formula (8)}$$

The minimum value $I_b$ of the output current of the first inductor L1 can be calculated by the following Formula (9).

[Mathematical 9]

$$I_b = \frac{1}{2} \frac{T_{on}^2}{T} \frac{V_{in}}{V_{out}} \left( \frac{V_{out}}{L_2} - \frac{V_{in}}{L_1} \right) \quad \text{Formula (9)}$$

In this case, "$L_1$" denotes an impedance of the first inductor L1, and "$L_2$" denotes an impedance of the second inductor L2.

The variation width $I_{pp1}$ of the current flowing through the first inductor L1 can be calculated by the following Formula (10).

[Mathematical 10]

$$I_{pp1} = \frac{V_{in}}{L_1} T_{on} = \frac{V_{out}}{L_1} T'_{off} \quad \text{Formula (10)}$$

Here, concrete setting values regarding circuit components constituting the SEPIC were as follows: $C_1$=0.1 [μF], $C_2$=0.068 [μF], $L_1$=1600 [μH], and $L_2$=455 [μH]. Concrete setting values of the input voltage $V_{in}$, the output voltage $V_{out}$ and output current $I_{out}$ of the conversion circuit 4 were as follows: $V_{in}$=242 [V], $V_{out}$=66.5 [V] and $I_{out}$=269 [mA]. A concrete setting value of the period T of the switching element Q1 switching ON/OFF was as follows: T=16.66 [μs].

"$T_{on}$=1.9 [μs]" can be obtained by substituting the above-mentioned setting values of $V_{out}$, $I_{out}$, $L_1$, $L_2$, T and $V_{ac}$ in Formula (7), and "$T'_{off}$=9.8 [μs]" can be obtained by substituting the above-mentioned setting values of $V_{ac}$, $V_{out}$, $I_{out}$, $L_1$, $L_2$ and T in Formula (8). "$I_b$=−37.7 [mA]" can be obtained by substituting the above-mentioned setting values of $V_{in}$, $V_{out}$, $L_1$, $L_2$, $T_{on}$ and T in Formula (9). "$I_{pp1}$=406.2 [mA]" can be obtained, when the input voltage $V_{in}$ of the conversion circuit 4 is at a peak value, by substituting the above-mentioned setting values of $V_{in}$, $V_{out}$, $L_1$, $T_{on}$ and $T'_{off}$ in Formula (10). "$\Delta V_{C2}$=23.8 [V]" can be obtained by substituting the above-mentioned setting value of $C_2$ and the obtained values of $I_b$, $I_{pp1}$ and $T'_{off}$ in Formula (6). "$V_{ZD}$>66.5 [V]+23.8 [V]=90.3 [V]" can be obtained by substituting the obtained value of $\Delta V_{C2}$ in Formula (4). Therefore, the DC power supply device 1 is preferable to include the Zener diode ZD having the Zener voltage $V_{ZD}$ equal to or larger than 90.3 [V], and more preferably, the Zener voltage $V_{ZD}$ is almost 1.5 times as large as a voltage to be applied to the light source 90 from the viewpoint of manufacturing cost. Accordingly, in the DC power supply device 1, the operation can be stabilized without the normal voltage applied across the first inductor L1 being clamped by the Zener diode ZD.

As apparent from the embodiment described above, a DC power supply device (1) according to a first aspect of the present disclosure includes a rectifier circuit (3), a conversion circuit (4) and a control circuit (5). The rectifier circuit (3) is configured to rectify an AC voltage output from an AC power source (AC1). The conversion circuit (4) is configured to convert a pulsating voltage from the rectifier circuit (3) into a DC voltage. The control circuit (5) is configured to control the conversion circuit (4). The conversion circuit (4) includes a first capacitor (C1), a first series circuit (41), a second series circuit (42), a third series circuit (43), a second diode (D2) and a Zener diode (ZD). The first series circuit (41) includes a first inductor (L1) and a switching element (Q1) that are connected in series with each other. The second series circuit (42) includes a second capacitor (C2) and a second inductor (L2) that are connected in series with each other. The third series circuit (43) includes a first diode (D1) and a third capacitor (C3) that are connected in series with each other. The first capacitor (C1) is electrically connected with a pair of output ends (3C, 3D) of the rectifier circuit (3). The first series circuit (41) is electrically connected between both ends of the first capacitor (C1). The second series circuit (42) is electrically connected in parallel with the switching element (Q1). The third series circuit (43) is electrically connected in parallel with the second inductor (L2). The control circuit (5) is configured to perform switching control for the switching element (Q1). The second diode (D2) has: an anode; and a cathode that is connected with a connection point (44) of the first capacitor (C1) and the first inductor (L1). The Zener diode (ZD) has: an anode; and a cathode that is connected with a connection point (45) of the first inductor (L1) and the second capacitor (C2). The anode of the second diode (D2) and the anode of the Zener diode (ZD) are electrically connected with each other. The Zener diode (ZD) has a Zener voltage larger than an output voltage of the conversion circuit (4).

Since the DC power supply device (1) according to the first aspect is configured as above, the resonance voltage generated in the first inductor (L1) is clamped by the Zener diode (ZD), and therefore, a voltage larger than the Zener voltage is not applied across the first inductor (L1). As a result, even when the resonance current flows through the LC resonance circuit, it is possible to reduce a voltage generated across the first inductor (L1), compared with a circuit configuration that the Zener diode (ZD) is not provided. Accordingly, it is possible to reduce a voltage to be applied between the drain terminal and the source terminal of the switching element (Q1) connected in series with the first inductor (L1), which can suppress the excess voltage from being applied to the switching element (Q1).

Regarding a DC power supply device (1) according to a second aspect of the present disclosure, in the first aspect, the Zener voltage is preferable to be 1.5 or more times as large as the output voltage of the conversion circuit (4).

In case the DC power supply device (1) according to the second aspect is configured as above, the operation can be stabilized without the normal voltage applied across the first inductor (L1) being clamped by the Zener diode (ZD).

Regarding a DC power supply device (1) according to a third aspect of the present disclosure, in the first aspect, the output voltage of the conversion circuit (4) is preferably represented by a voltage across the third capacitor (C3).

Regarding a DC power supply device (1) according to a fourth aspect of the present disclosure, in the first aspect, the control circuit (5) is preferably configured to perform switching control for the switching element (Q1) for keeping constant an output current of the conversion circuit (4).

A lighting system according to a fifth aspect of the present disclosure includes: the DC power supply device (1) according to any one of the first to the fourth aspects; and a light source (90) configured so as to be driven by the output voltage of the conversion circuit (4) of the DC power supply device (1). According to this configuration, it is possible to provide the lighting system including the DC power supply device (1), which can suppress the excess voltage from being applied to the switching element (Q1).

Regarding a lighting system according to a sixth aspect of the present disclosure, in the fifth aspect, the light source (90) is preferably connected in parallel with the third capacitor (C3).

Regarding a lighting system according to a seventh aspect of the present disclosure, in the fifth aspect, the control circuit (5) is preferably configured to perform switching control for the switching element (Q1) for keeping constant an output current provided to the light source (90).

Regarding a lighting system according to an eighth aspect of the present disclosure, in the fifth aspect, the light source (90) preferably includes at least one of an LED or EL element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A DC power supply device, comprising:
   a rectifier circuit configured to rectify an AC voltage output from an AC power source;
   a conversion circuit configured to convert a pulsating voltage from the rectifier circuit into a DC voltage; and
   a control circuit configured to control the conversion circuit,
   the conversion circuit comprising:
   a first capacitor;
   a first series circuit including a first inductor and a switching element that are connected in series with each other;
   a second series circuit including a second capacitor and a second inductor that are connected in series with each other;
   a third series circuit including a first diode and a third capacitor that are connected in series with each other;
   a second diode; and
   a Zener diode,
   the first capacitor being electrically connected with a pair of output ends of the rectifier circuit, the first series circuit being electrically connected between both ends of the first capacitor, the second series circuit being electrically connected in parallel with the switching element, and the third series circuit being electrically connected in parallel with the second inductor,
   the control circuit being configured to perform switching control for the switching element,
   the second diode having: an anode; and a cathode that is connected with a connection point of the first capacitor and the first inductor,
   the Zener diode having: an anode; and a cathode that is connected with a connection point of the first inductor and the second capacitor,
   the anode of the second diode and the anode of the Zener diode being electrically connected with each other, and
   the Zener diode having a Zener voltage larger than an output voltage of the conversion circuit.

2. The DC power supply device according to claim 1, wherein the Zener voltage is 1.5 or more times as large as the output voltage of the conversion circuit.

3. The DC power supply device according to claim 1, wherein the output voltage of the conversion circuit is represented by a voltage across the third capacitor.

4. The DC power supply device according to claim 1, wherein the control circuit is configured to perform switching control for the switching element for keeping constant an output current of the conversion circuit.

5. A lighting system, comprising:
   the DC power supply device according to claim 1; and
   a light source configured so as to be driven by the output voltage of the conversion circuit of the DC power supply device.

6. The lighting system according to claim 5, wherein the light source is connected in parallel with the third capacitor.

7. The lighting system according to claim 5, wherein the control circuit is configured to perform switching control for the switching element for keeping constant an output current provided to the light source.

8. The lighting system according to claim 5, wherein the light source comprises at least one of an LED or EL element.

* * * * *